Figure 11:
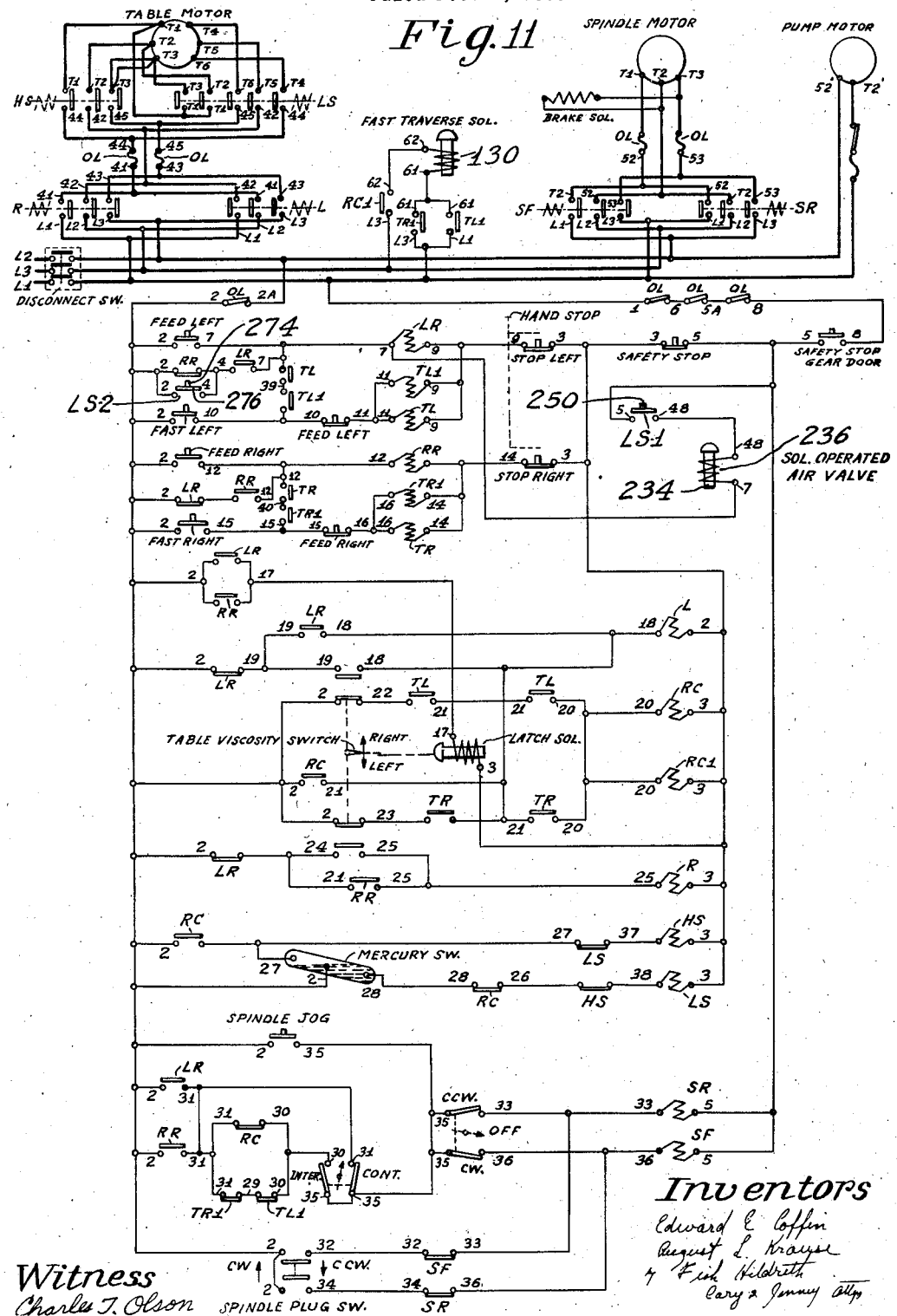

Oct. 28, 1941.  E. E. COFFIN ET AL  2,261,052
MACHINE TOOL
Filed Dec. 7, 1939  5 Sheets-Sheet 1
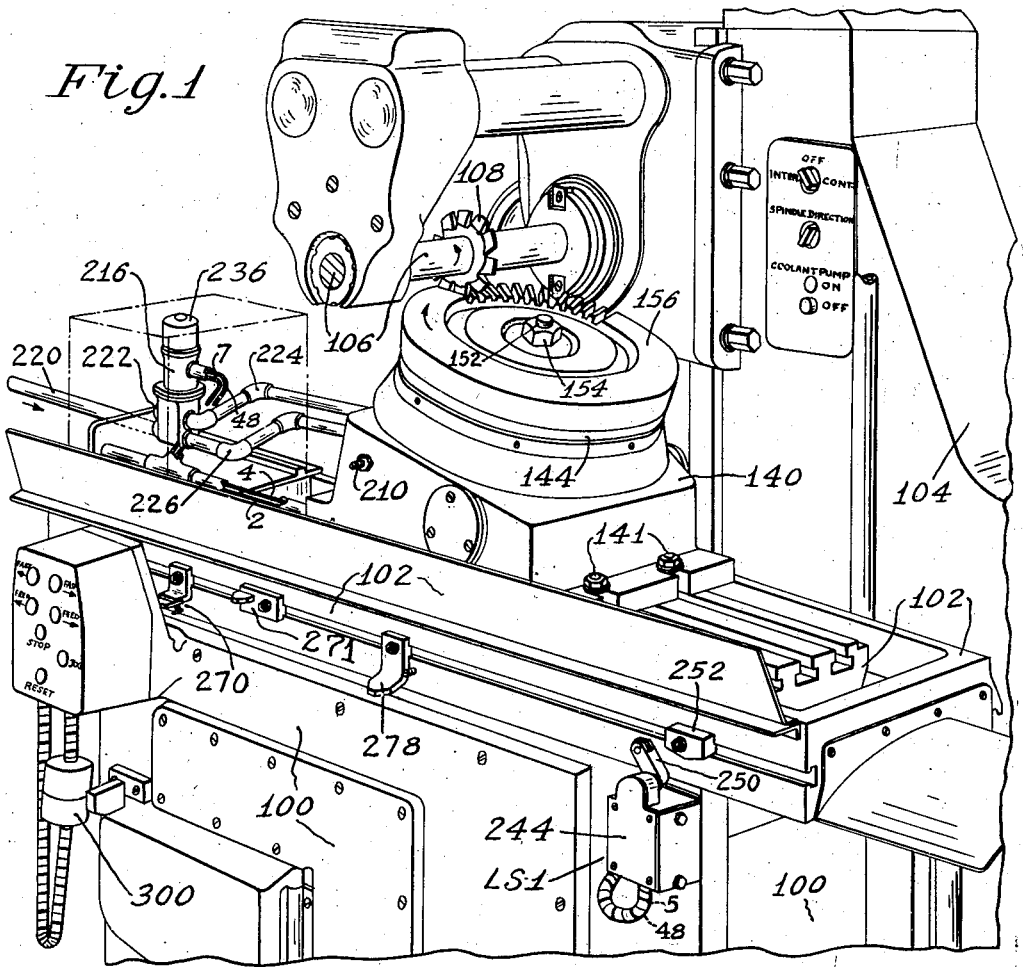
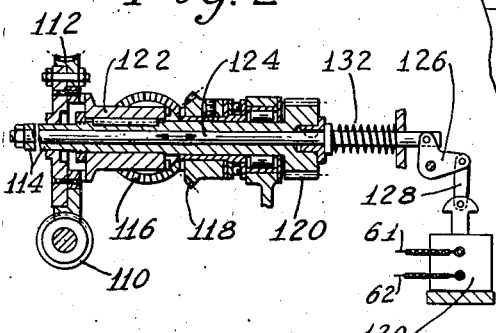
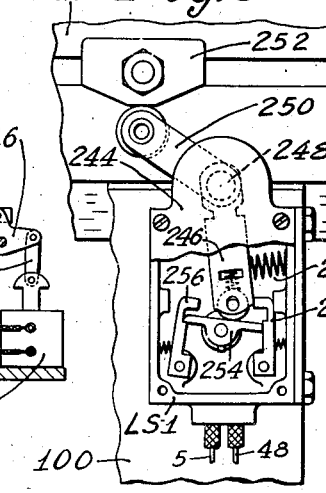
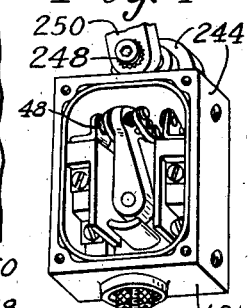
Witness
Charles T. Olson
Inventors
Edward E. Coffin
August L. Krause

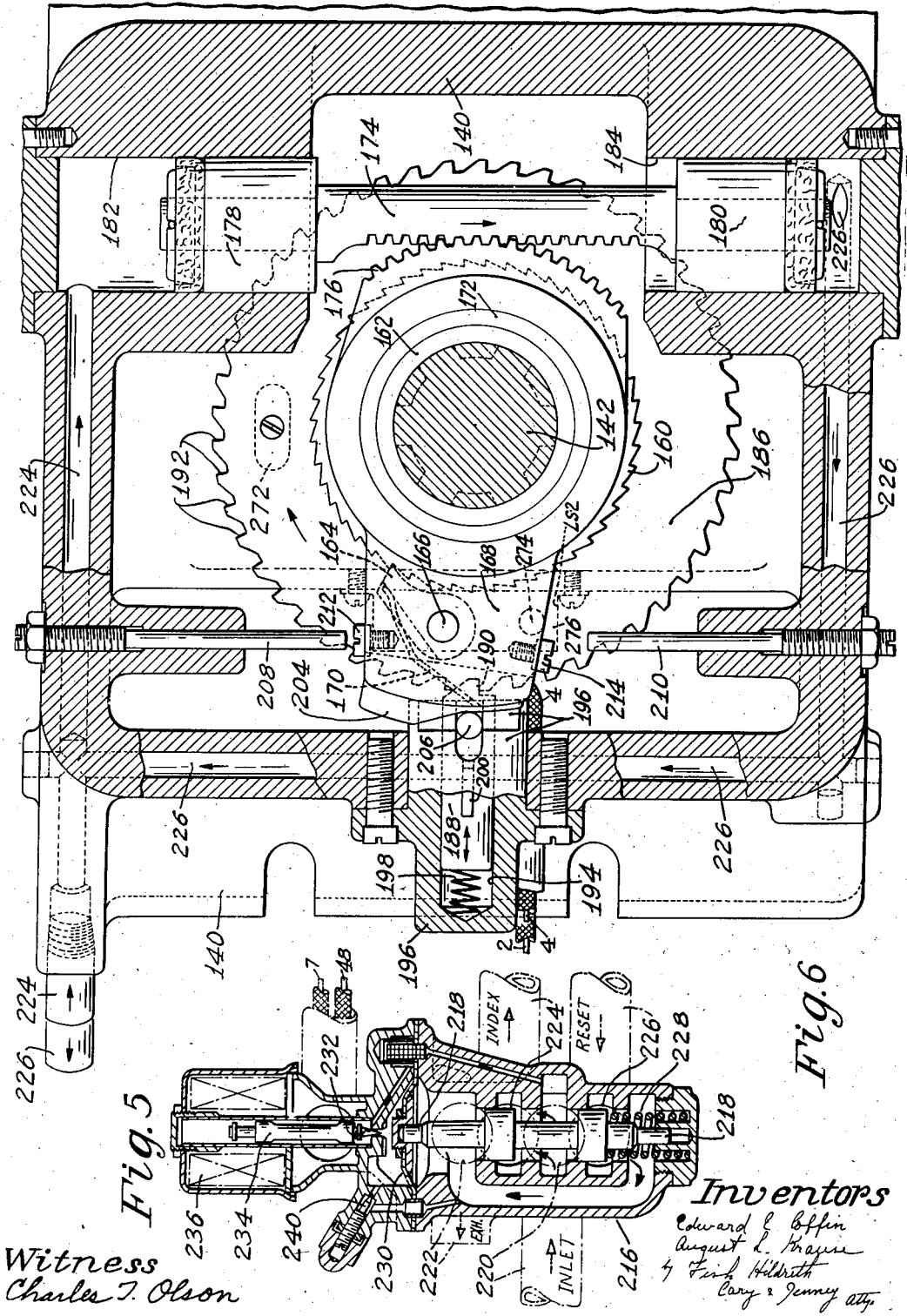

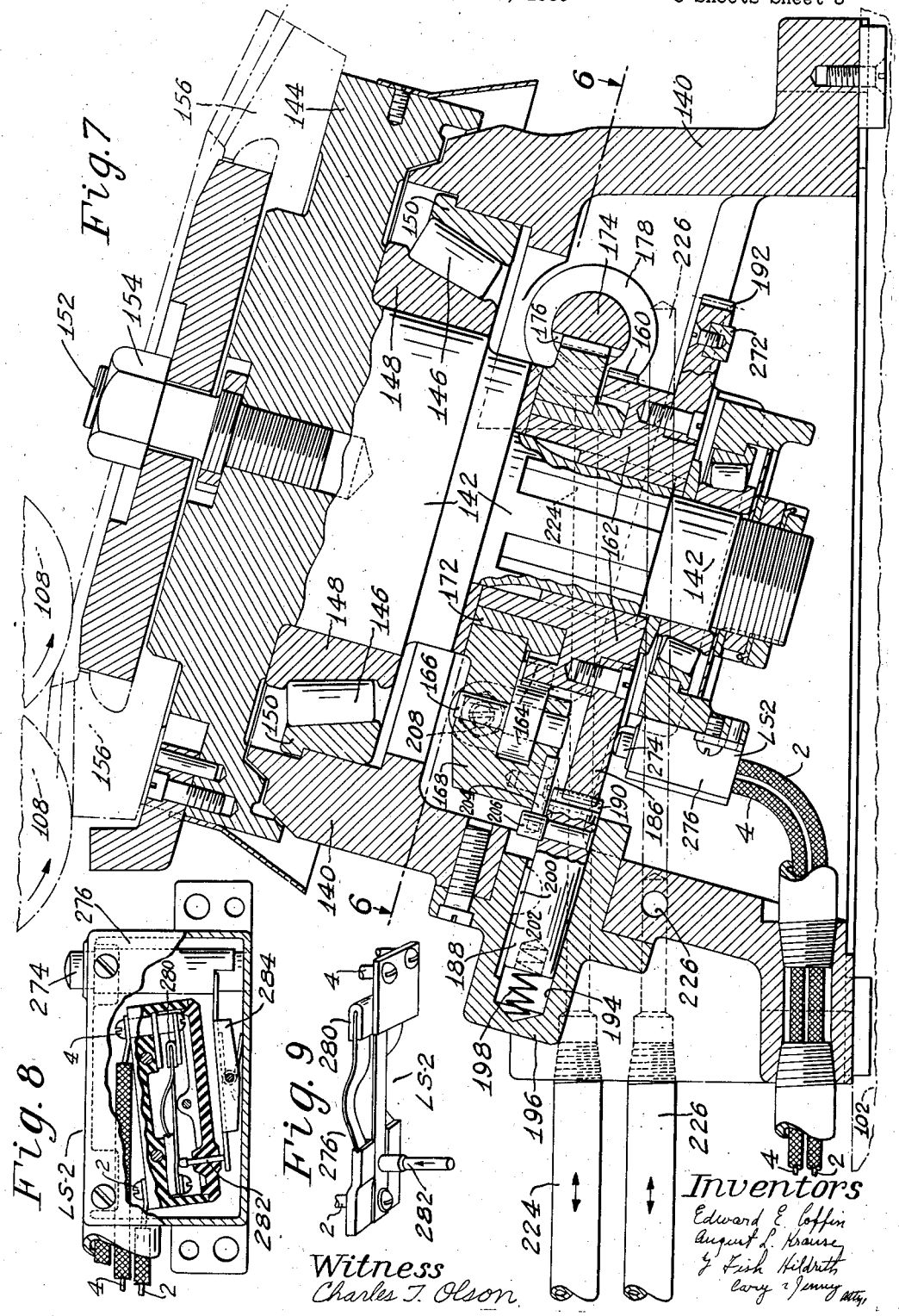

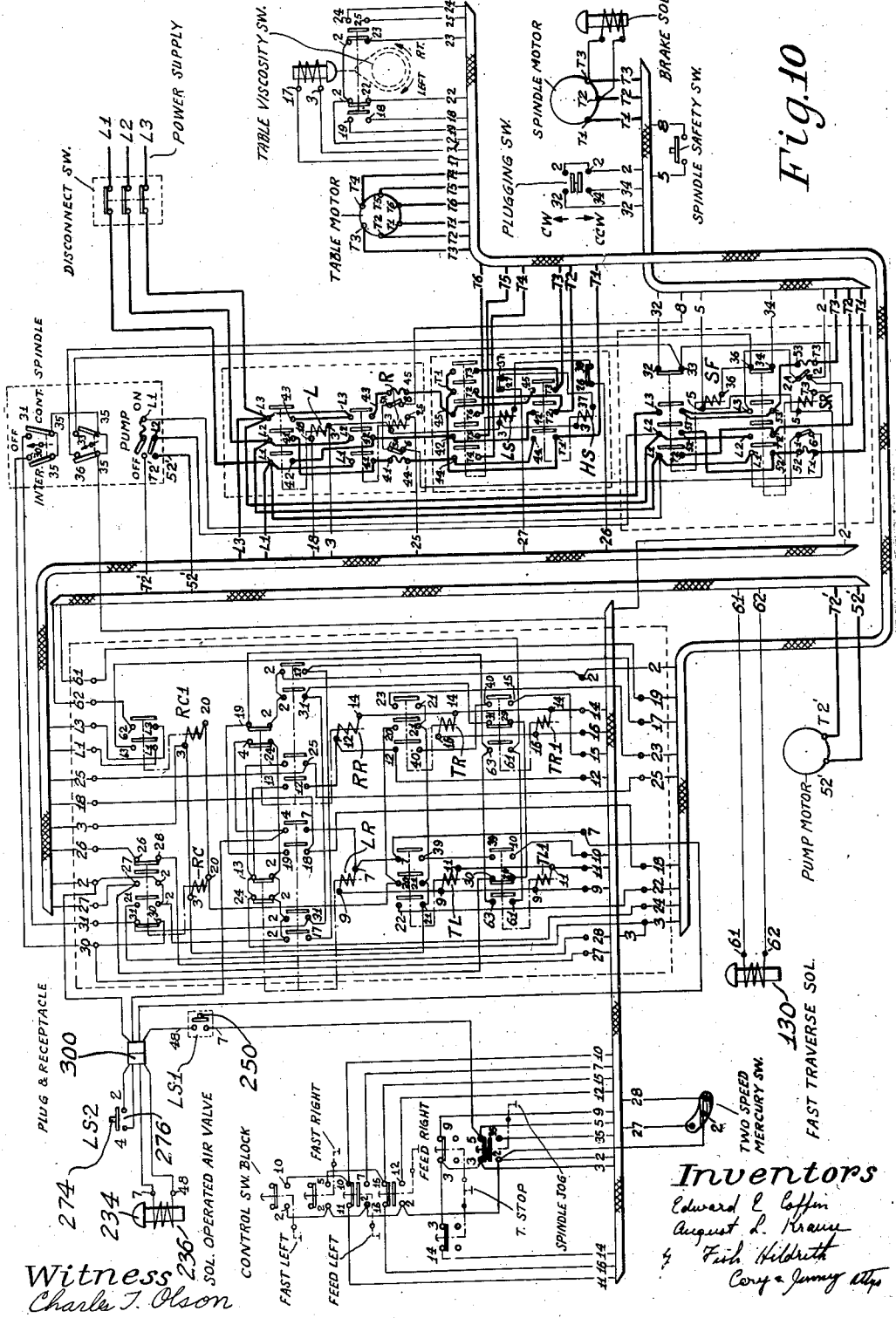

Patented Oct. 28, 1941

2,261,052

UNITED STATES PATENT OFFICE 2,261,052

MACHINE TOOL

Edward E. Coffin and August L. Krause, Providence, R. I., assignors to Brown and Sharpe Manufacturing Company, a corporation of Rhode Island Application December 7, 1939, Serial No. 308,094

14 Claims. (Cl. 90—56)

The present invention relates to improvements in machine tools, and more particularly to an improved indexing mechanism and a control system therefor adapted for use in the production of bevel gears and similar articles on a machine of the general type having a tool spindle and a work support capable of relative reciprocatory translatory movements, and an indexing work spindle mounted on the tool support.

The machine is herein disclosed as embodied in a milling machine of the general type illustrated in the patent to Graves and Bennett No. 2,124,852, dated July 26, 1938, including a rotary milling cutter and a movable work support driven from a reversible electric motor for effecting relative translatory movements of the work support and cutter. The machine is also provided with an electrical control system including means for automatically controlling the reciprocation of the work table. In accordance with the invention, applicants have provided an indexing work head which is carried on the work table, and includes a work spindle, indexing mechanism for the work spindle, and devices responsive to the table movement and to the rotation of the indexing work spindle for controlling the operation of the work table and indexing work spindle in the performance of an automatic gear cutting operation.

It is a principal object of the invention to provide in a machine of this general description adapted for automatic operation in the production of bevel gears and similar articles, a novel and improved indexing head which is simple in construction, efficient in operation, and readily susceptible of automatic control in coordination with the reciprocating work table and other operating parts of the machine.

It is a further object of the invention to provide in a machine of this general description, a novel and improved indexing mechanism which is arranged to be actuated by fluid pressure operated means, and is also well adapted to be electrically controlled through the agency of switch connections actuated preferably by dogs adjustably supported on the reciprocating work table.

Another object of the invention consists in the provision in a machine of this general description, of an improved electrical control system for the machine including operating controls for applicants' indexing head, so that the machine may be readily adapted for completely automatic operation in the production of bevel gears and similar articles.

With these and other objects in view as may hereinafter appear, the several features of the invention consist in the devices, combinations and arrangement of parts hereinafter described and claimed, which together with the advantages to be obtained thereby, will be readily understood by one skilled in the art from the following description taken in connection with the accompanying drawings, in which Fig. 1 is a perspective view of a milling machine having applicants' improved indexing head attachments mounted thereon; Fig. 2 is a detail sectional view indicating the driving connections for the work supporting table, and including the feed quick-traverse clutch and its controlling solenoid; Fig. 3 is a detail view in front elevation of the indexing switch and its actuating table dog, a portion of the switch casing being broken away to show the underlying parts; Fig. 4 is a perspective view of the indexing switch looking from the rear; Fig. 5 is a detail sectional view in front elevation of the hydro-electric control valve through which the operation of the indexing mechanism is controlled; Fig. 6 is a sectional plan view taken on the line 6—6 of Fig. 7, illustrating the indexing mechanism; Fig. 7 is a sectional view in front elevation taken through the middle of the indexing head, and illustrating the indexing mechanism; Fig. 8 is an enlarged detail view of the limit switch controlled by the rotation of the work spindle to cause the return of the work table to loading position after 360° of rotation of the work spindle; Fig. 9 is a perspective detail view of the snap switch arm and its actuating plunger shown in Fig. 8; Fig. 10 is a diagrammatic view of the electrical connections for controlling the operation of the machine; and Fig. 11 is an explanatory diagram of the electrical connections illustrated in Fig. 10.

In carrying out the present invention, applicants have provided an indexing head which is in the nature of an attachment, but which is readily integrated with an ordinary milling machine to provide a fully automatic machine adapted for the cutting of bevel gears and similar articles. In order to reduce the complexity and size of the attachment to a minimum, fluid pressure, preferably compressed air is employed as a source of power to actuate the indexing mechanism. In accordance with one feature of the invention, applicants have provided a fluid pressure actuating indexing head of novel and improved construction which is readily susceptible of electrical control as, for example, by means of table dog actuated switch connections, thus facilitating the integration of the attachment into the machine to produce a unified and wholly automatic organization.

The salient features of the indexing mechanism through which the work spindle is rotated and held in successive indexed positions include an index pawl and ratchet, an index plate rotatable with the work spindle, and a locking element movable into and out of locking position with relation to the indexing plate. In accordance with one feature of the invention, applicants provide an oscillatory pawl carrier, actuated by fluid pressure, which mechanically controls also the withdrawal and return of the locking element to locking position. The construction and operation of these parts is such as to insure a maximum of certainty and accuracy in the operation of the indexing mechanism. In the illustrated construction, the cam associated with the pawl carrier operates during the retracting or resetting movement of the carrier to move the locking element out of locking position, and subsequently acts during the indexing movement of the carrier and pawl to permit the return of the locking element into the path of movement of the next stop on the indexing plate.

The pawl carrier is oscillated by means of a reversible fluid motor in the form of a piston which is in turn controlled through the operation of a solenoid operated fluid pressure reversing valve. In operation the reversing valve is shifted to one position by the energizing of the solenoid to reset the pawl carrier and to disengage the locking element, and is returned to its initial position by the deenergizing of the solenoid to index the pawl carrier, and simultaneously to interpose the locking element in its locking position. The construction and arrangement of the operating controls is such that the reversing valve is maintained in its index position during the subsequent tooth milling operation, so that the operating parts including the indexing plate and the work spindle are held in position against the locking element by the fluid pressure exerted through the fluid motor, pawl carrier and pawl.

Further in accordance with the invention, applicants have provided certain electrical controls for controlling the operation of the indexing mechanism, and for causing the work table to return to its initial loading position at the conclusion of the automatic gear cutting cycle. These connections include a dog operated switch which operates as the work table returns to its feed start position first to energize the solenoid to reset the indexing mechanism, and thereafter to de-energize the solenoid to index the work spindle into position for the milling of the next tooth. The electrical controls referred to, also include a limit switch which is rendered operative when the work spindle has rotated through 360° of rotation to disable one of the dog actuated reversing switches for the work table, thus permitting the table to return past its index position to the initial loading position.

Referring more specifically to the drawings which illustrate a milling machine embodying in a preferred form the several features of the invention, the machine base is designated at 100 in Fig. 1, providing support for a longitudinally movable work table 102 and a machine column 104 on which is supported a transversely extending cutter spindle 106 having mounted thereon a milling cutter 108. As indicated in the electrical wiring diagram of Fig. 10, the work table is driven by means of a reversible electric motor through driving connections, which may be of ordinary description, and in the illustrated embodiment of the invention include a solenoid controlled feed quick-traverse clutch. The driving connections for the table, as shown in Fig. 2, and electrical diagrams 10 and 11, and as more fully illustrated in the Graves and Bennett patent above referred to, comprise a feed train terminating in a worm 110 and a worm gear 112 loosely sleeved on driven shaft 114, and a quick traverse train terminating in a bevel gear 116 and a sleeve bevel gear 118 loosely sleeved on the driven shaft 114. The driven shaft 114 carries at one end thereof a pinion 120 which is connected to drive the table feed screw (not shown). The driven shaft 114 may be connected to be driven at alternative feed and traverse rates by means of a feed quick-traverse clutch member 122 secured to the driven shaft 114 and interposed between the slow feed worm wheel 112 and the quick traverse bevel gear 118. The feed quick-reverse clutch member 122 and driven shaft 114 are shifted axially between feed and quick traverse positions by means of connections including a control rod 124 supported within an axial bore in the driven shaft 114, and connected at one end through a bell-crank 126 and link 128 with the armature of a feed quick-traverse solenoid 130. A compression spring 132 tends normally to maintain the clutch in its feed position.

Inasmuch as the mechanical features of construction of the machine aside from the indexing head are similar to those fully described and illustrated in the Graves and Bennett patent above referred to, it is believed that further description of the same is unnecessary and may be omitted.

For a full understanding of the construction and arrangement of the electrical control system of the machine, a reference may be had to the electrical diagrams constituting Figs. 10 and 11 of the drawings, which are believed to be self-explanatory. This electrical control system, except as hereinafter more particularly pointed out, may be considered as substantially the same as that fully illustrated and described in the patent to Bennett and Krause No. 2,068,840, dated January 26, 1937, for a Milling machine. As set forth in the electrical wiring diagram Fig. 10 and the explanatory diagram Fig. 11, the machine is provided with a reversible table driving motor and a reversible spindle driving motor, these motors being driven from a three phase power line designated as L1, L2 and L3. The table motor is controlled by means of a reversing switch having two exciting relays L and R.

The main switch for the table motor comprises two sets of contacts which are controlled by the relay coils L and R respectively, to connect the motor and table for left and right hand operation. A high speed and low speed for the table motor is provided comprising two sets of contacts controlled respectively by the relay coils HS and LS for high speed and low speed operation of the table motor. The operation of the cutter spindle motor is similarly controlled by relay coils SF and SR for opposite directions of rotation of the motor and the spindle driven thereby. Secondary relays for controlling the operation of the table and spindle switches above described, include secondary coils LR and TR controlled respectively by the left and right feed buttons of the machine, the coils TL and TR controlled respectively by the left and right quick traverse buttons, and secondary relay coils RC and RC—1 which control the operation of the slow feed and quick traverse solenoid 130, and also have connections which are arranged under certain operating conditions to control the operation of the high speed table motor and spindle motor switches.

The indexing head disclosed in the drawings as embodying in a preferred form features of the present invention, comprises an indexing base 140 which is securely fastened by bolts and nuts 141 to the work table 102 of the machine. On the indexing base 140 is supported a work spindle 142 having the upper end thereof in the form of a disk 144 which serves to support the work. The work spindle 142 is rotatably supported on a roller bearing comprising the rollers 146, an inner race 148 secured to the work spindle, and an outer race 150 mounted on the base 140. A fastening screw 152 threaded into the upper end of the work spindle and nut 154, provide a convenient means for securing a work piece 156 to the work spindle.

In accordance with the invention, applicants have provided a novel and improved indexing mechanism for controlling the indexing of the work spindle 142. As best shown in Figs. 6 and 7, the indexing mechanism comprises a ratchet 160 formed on a sleeve member 162 secured to the work spindle 142, and a pawl 164 pivotally mounted at 166 on a pawl carrier plate 168. A leaf spring 170 on the pawl carrier plate 168 tends to maintain the pawl in engagement with the ratchet. The carrier plate is pivotally supported on a bearing sleeve 172 carried on the sleeve member 162, and is arranged to be oscillated by means of a rack bar 174 which meshes with a gear segment 176 on the pawl carrier plate 168. The rack bar 174 has secured to opposite ends thereof, pistons 178 and 180 which slide respectively in chambers 182 and 184. The pistons 178 and 180 comprise a fluid motor, the operation of which is controlled through fluid pressure actuating connections including a reversing valve hereinafter more fully to be described.

The extent of each indexing movement imparted by the oscillatory pawl carrier and pawl 164 above described, is determined by means of indexing plate 186 rigidly secured on the sleeve member 162 to turn with the work spindle 142, and a cooperating locking element in the form of a locking plunger 188 having formed on the forward end thereof a stop surface 190 arranged for engagement with similarly shaped tooth stop surfaces 192 on the periphery of the indexing plate 186. The locking plunger 188 is slidably supported in a recess formed in a bracket 196 secured to the indexing base 140, and is spring-pressed into engagement with the index plate 186 by means of a compression spring 198 seated in the base of the recess 194. A key 200 is mounted on the plunger for engagement with a slot 202 to prevent rotational movement of the plunger.

The locking plunger 188 is moved rearwardly out of locking position during each resetting or retracting movement of the pawl carrier plate 166 and pawl 164, and is subsequently permitted to return to its locking position during the indexing movement of the carrier and pawl by means of a cam 204 secured to the under side of the pawl carrier plate 168 and arranged for engagement with an upwardly extending pin 206 in the plunger 188. The cam is so arranged as to move the plunger to inoperative position only after the carrier plate 168 and pawl 164 have moved an appreciable distance toward their retracted or reset position, so that during the advancing or indexing movement of the carrier and pawl, the spring-pressed locking plunger 188 will have plenty of time within which to engage behind the next succeeding toothed stop 192 of the index plate 186. As best shown in Fig. 6 of the drawings, the movement of the pawl carrier plate 168 in each direction is positively limited by two adjustable stop rods 208 and 210 which are arranged to engage against stop screws 212 and 214 on the carrier plate 168. As best shown, for example, in Fig. 6, the stop rod 208 is normally adjusted with relation to its cooperating stop screw 212, so that the indexing movement of the carrier and pawl will be limited, not by the engagement of these parts, but by the engagement of the locking plunger 188 with the next toothed stop surface on the index plate 186.

The oscillatory resetting and indexing movements are imparted to the pawl carrier plate 168 through fluid pressure operating connections including a fluid pressure reversing valve which acts alternately to supply and to exhaust fluid pressure from the pistons 178 and 180 secured to opposite ends of the rack bar 174. This reversing valve which may be of a well known construction, is particularly illustrated in Fig. 5 of the drawings, and comprises a casing 216 and an axially shiftable valve plunger 218 for controlling the flow of compressed air with relation to an inlet 220, an exhaust 222, a supply line 224 marked Index as indicating the supply line through which fluid pressure is supplied to effect the indexing operation, and a fluid pressure supply line 226 marked Reset as indicating the supply line through which fluid pressure is supplied to effect the resetting of the pawl carrier plate 168. A compression spring 228 tends normally to move the plunger 218 upwardly to the index position. For shifting the valve plunger 218 to its reset position against the pressure of the spring 228, the plunger is connected at its upper end to a diaphragm 230 to which fluid pressure is supplied through a supply line and admission valve 232. The valve 232 comprises a valve member formed on the armature 234 of a solenoid 236 which with the solenoid in its normally de-energized position is allowed to drop against its seat to prevent the admission of fluid pressure to the chamber above the diaphragm 230. For this position of the parts which is that shown in Fig. 5, compressed air entering the inlet 220 will pass upwardly past the stem of the valve plunger 218 to the indexing supply line 224, whence it is directed against the face of the piston 178. At the same time fluid pressure is exhausted from the face of the piston 180 through the resetting supply line 226 flowing downwardly past the stem of the plunger 218, and thence outwardly through the exhaust 222 into the atmosphere.

Assuming that the solenoid 236 is now energized, causing the valve 232 to be opened, fluid pressure is supplied into the chamber above the diaphragm 230, causing the diaphragm and plunger 218 to be moved downwardly, thus reversing the flow through each of the index and reset supply lines 222 and 226. When the solenoid 236 is again de-energized, the valve plunger 218 is permitted to return to its index position as shown in Fig. 5, as the pressure is gradually exhausted through an exhaust needle valve 240.

It will readily be seen that the fluid pressure actuated mechanism above described including the reversing valve is readily susceptible of electrical control requiring only the opening and closing of an electrical circuit to the solenoid 236.

In the illustrated embodiment of the invention, applicants have provided a table dog actuated switch connection which is operative each time the table returns to its position for beginning the next cut, first to energize the electromagnet 236 to reset the pawl carrier plate 168, and thereafter to impart an indexing movement to the carrier plate. The indexing switch generally indicated at 244 comprises a separate unit which is supported on the base adjacent the front side of the work table 102. As shown, for example, in Figs. 1, 3 and 4, the switch comprises the casing 244, and a switch lever 246 pivoted at 248 in the casing 244, and having an upwardly extending arm 250 adapted for engagement with a dog 252 on the work table. The switch arm 246 at its lower end contacts with a rocker arm 254 and alternately with contact arms 256 and 258. In the illustrated construction, only the contact arm 258 is utilized, so that the switch moves between the closed position of Fig. 2, and an alternative open position under the influence of a compression spring 260. By reference to the explanatory diagram Fig. 11, it will readily be seen that the closing of the switch contact 5—48 which is effected by movement of the switch to the position of Fig. 3, causes the solenoid 236 to be energized to shift the fluid pressure reversing valve to reset position.

Assuming a cycle of operation in which the work table is arranged to start from a loading position at the extreme left, the pushing of the fast right button will act to advance the table at a traverse rate until it is slowed down through the contacting of a feed right dog 270 with the corresponding dog actuated button on the control box at the front of the table. Thereafter the table proceeds at a feed rate for the performance of a milling cut. At the completion of this milling cut, a reversing dog (not shown) properly located on the table engages a dog actuated traverse left button on the feed box, causing the table to return toward its starting position at the traverse rate. As the cutter again emerges from the work, the indexing switch dog 252 engages with the switch arm 250 to close the indexing switch contacts 5—48. Inasmuch as the table is at this time travelling to the left at the traverse rate, an interlock contact LR4—7 and RR contact 204 are closed, the closing of the indexing switch acts to energize the solenoid 236 to reset the indexing mechanism. Further progress of the table to its reversing position, causes the indexing switch dog 252 to be disengaged from the switch arm 250, de-energizing the electro-magnet 236, and thereby effecting the indexing of the work. The direction of the table travel is now reversed by the engagement of the traverse right dog 271, with the traverse right switch button. During the return movement of the table to the right, the indexing dog 252 will ride over and depress the switch arm 250, but this movement is ineffective to energize the solenoid, inasmuch as during the traverse to the right the connections including the LR interlock 4—7 and the TL interlock 7—39 are open. This traverse return and indexing cycle of operations is continued without interruption during 360° of rotation of the work spindle in the cutting of a bevel gear as, for example, that illustrated in Fig. 1 of the drawings.

After the gear blank has been indexed through a complete revolution, the cam 272 located on the under side of the index plate 186 is arranged to come into contact with a cam actuated plunger 274 of a limit switch 276, and generally designated in the electrical diagram as LS—2, which acts to disable the traverse right switch connection, so that the table instead of again reversing its direction, continues its travel to the left to its initial loading position as determined by the position of the safety stop dog 278. The limit switch 276, as illustrated in Figs. 8 and 9, is of the conventional type comprising a spring switch arm 280 held normally in open position, and arranged to be snapped into closed position by the thrusting movement of a pin 282 which is arranged to be actuated by the cam actuated plunger 274 and an intervening lever 284.

The operation of the electrical control system as modified by the addition of switch LS—2 may be described briefly as follows:

Assuming that the work spindle 142 has been rotated through 360°, the cam 272 will have moved into contact with the cam actuated plunger 274 to close switch LS—2 during the return movement of the work table to the left. As the table now reaches its traverse reverse position in which the traverse right dog 271 acts to close the traverse right switch contact 2—12, the switch LS—2 will have been closed to prevent the opening of the LR and TL circuits as contact RR2—4 drops out. Inasmuch as the table motor switch L will not be de-energized, or the table motor switch R energized until after the switch L has been de-energized, the table continues its travel to the left to its initial loading position.

In order that the indexing head including the electrical controls for the same may be readily assembled and disassembled from the machine as an attachment, the four connections to and from the solenoid 236 and limit switch LS—2 are arranged to pass through a plug 300. The opening of the plug 300 effectively disconnects the auxiliary circuits above described, having to do with the operation of the indexing head without otherwise affecting the operation of the electrical control system for the machine.

It will be understood that the invention is not limited to the specific embodiment shown, and that various deviations may be made therefrom without departing from the spirit and scope of the appended claims.

What is claimed is:

1. In a machine tool having a cutting tool, and a work support arranged for reciprocatory movements relative to the cutting tool, an indexing work spindle on the work support, an indexing mechanism for the work spindle carried on the work support including fluid pressure actuating means, and a fluid pressure control valve actuable to effect successive indexing movements of the work spindle, and electrical connections controlled by the reciprocatory movement of the work support for actuating the valve to index the work spindle.

2. In a machine tool having a cutting tool, and a work support arranged for reciprocatory movements relative to the cutting tool, an indexing work spindle on the work support, an indexing mechanism for the work spindle carried on the work support including fluid pressure actuating means, and a fluid pressure control valve actuable to effect successive indexing movements of the work spindle, electrical connections including a solenoid on the work support for actuating said valve, a switch for energizing and de-energizing the solenoid, and means controlled by said reciprocatory movement of the work support for actuating the switch.

3. In a machine tool having a cutting tool, and a work support arranged for reciprocatory movements relative to the cutting tool, an indexing work spindle on the work support, an indexing mechanism for the work spindle carried on the work support including fluid pressure actuating means, and a fluid pressure control valve shiftable to alternative positions to effect alternate resetting and indexing movements of the indexing mechanism to index the work spindle, electrical connections including a solenoid on the work support for actuating the valve, a switch for energizing and de-energizing the solenoid, and means controlled by the translatory movement of the work support to close and subsequently to open said switch, and thereby to effect successive resetting and indexing movements of said indexing mechanism.

4. In a machine tool having a cutting tool and a work support arranged for relative reciprocatory movements, an indexing work spindle on the work support, an indexing mechanism for the work spindle including a pawl and ratchet, an oscillatory pawl carrier, a locking element arranged for locking the spindle in each successive indexed position, cam means associated with the pawl carrier rendered operative by the resetting movement of the carrier to move the locking element from its locking position, and by the indexing movement of the carrier to permit the return of the locking element to locking position, and means for actuating the pawl carrier.

5. In a machine tool having a cutting tool and a work support arranged for relative reciprocatory movements, an indexing work spindle on the work support, an indexing mechanism for the work spindle including a ratchet on the work spindle, a pawl, an oscillatory pawl carrier, an indexing plate on the work spindle, a locking element, means for yieldingly holding the locking element in locking engagement with the index plate, a cam on the pawl carrier operative during the resetting movement of the carrier and pawl to move the locking element from its locking position and by the indexing movement of the carrier to cause the return of the locking element to locking position, and means for oscillating the pawl carrier.

6. In a machine tool having a cutting tool and a work support arranged for relative reciprocatory movements, an indexing work spindle on the work support, an indexing mechanism including a ratchet on the work spindle, a pawl, an oscillatory pawl carrier, an indexing plate on the work spindle, a locking element, means yieldingly holding the locking element in locking engagement with the index plate, cam means operative during the resetting stroke of the pawl carrier to retract the locking element and operative during the advancing stroke of the carrier and pawl to release the locking element and thereby to arrest the advance of the pawl and work spindle driven thereby, and fluid pressure actuating means for the pawl carrier operable to advance the pawl and to hold the pawl and work spindle actuated thereby against the locking element.

7. In a machine tool having a cutting tool and a work support arranged for relative reciprocatory movements, an indexing work spindle on the work support, an indexing mechanism including an indexing element having alternate indexing and resetting movements, a locking element and cooperating stops associated with the work spindle for arresting movement of the spindle in successive indexed positions, and means operative during the resetting movement of the indexing element to shift the locking element to inoperative position and during the indexing movement of the indexing element to return the locking element to locking position, and actuating means for the indexing element having a yielding action to index said element and to hold said element and work spindle actuated thereby in its indexed position against the locking element.

8. In a machine tool having a cutting tool and a work support arranged for relative reciprocatory movements, an indexing work spindle on the work support, an indexing mechanism for the work spindle including an indexing element having alternate indexing and resetting movements, a locking element and cooperating stops associated with the work spindle for arresting movement of the spindle in successive indexed positions, means actuated by the resetting movement of the indexing element to move the locking element to inoperative position, and by the indexing movement of the indexing element to cause the locking element to be returned to locking position, and actuating means for the indexing element having a yielding action to index said element and to hold said element and work spindle actuated thereby in its indexed position against the locking element.

9. In a machine tool having a cutting tool and a work support arranged for relative reciprocatory movements, an indexing work spindle on the work support, an indexing mechanism for the work spindle including an indexing element having alternate resetting and indexing movements, a locking element and cooperating stops associated with the work spindle for arresting movement of the spindle in successive indexed positions, means controlled by the resetting movement of the indexing element to move the locking element to inoperative position, and by the indexing movement of the indexing element to cause the locking element to be returned to locking position, and fluid pressure actuating means for the indexing element including a reversible fluid motor connected to actuate said indexing element, means for supplying fluid under pressure to the motor, a reversing valve for said motor, and means for actuating the valve to reset the indexing element, and thereafter to reverse the fluid motor to index the indexing element and work spindle and to maintain the work spindle in its indexed position against the locking element.

10. In a milling machine having a tool spindle, a longitudinally movable work table, an indexing work spindle on the work table, driving and reversing mechanism operable to reciprocate the work table, an indexing mechanism for the work spindle, and an electrical control system for the machine including a table start switch operable to start the table from loading position, a stop switch actuated by a return movement of the table to loading position to stop the table, reversing switch connections actuated by movement of the table for reversing the direction of table movement to effect a continuous reciprocation of the table and work spindle thereon with relation to the tool spindle, table actuated switch connections operative to effect successive indexing movements of the work spindle, and a switch connection actuated by movement of the work spindle through a predetermined angular distance from its starting indexing position to disable one of said reversing switch connections whereby the table is permitted to return to its loading position.

11. In a milling machine having a tool spindle, a longitudinally movable work table, an indexing work spindle on the work table, an indexing mechanism for the work spindle carried on the work table including an indexing element having alternate indexing and resetting movements, and an electrical control system for the machine including electrically operated switch connections for starting, stopping and reversing the table, a solenoid on the work table and means controlled by the energizing of the solenoid to effect one of said movements of the indexing element and by the deenergizing of said solenoid to effect the other of said movements of the indexing element, and a switch controlled by movement of the table for closing and opening the circuit thru said solenoid.

12. In a milling machine having a tool spindle, a longitudinally movable work table, an indexing work spindle on the work table, an indexing mechanism for the work spindle carried on the work table including an indexing element having alternate indexing and resetting movements, and an electrical control system for the machine including electrically operated switch connections for starting, stopping and reversing the table, a solenoid on the work table and means controlled by the energizing of the solenoid to effect one of said movements of the indexing element and by the deenergizing of said solenoid to effect the other of said movements of the indexing element, a table dog, switch connections actuated by the dog for closing and opening the circuit thru said solenoid, said dog actuated switch connections including connections operative to close and open the circuit thru the solenoid during one direction of movement of the table only.

13. In a milling machine having a tool spindle, a longitudinally movable work table, an indexing spindle on the work table, an indexing mechanism for the work spindle carried on the work table including fluid pressure actuating means, and a fluid pressure control valve actuable to effect successive indexing movements of the work spindle, an electrical control system for the machine including switch connections for starting, stopping and reversing the table, electrical connections including a solenoid on the work table for actuating the valve, electrical connections including a switch operative to energize and deenergize the solenoid during table travel in one direction only, and a table dog for actuating said switch.

14. In a milling machine having a tool spindle, a longitudinally movable work table, a reversible electric motor for driving the table, an indexing head comprising an indexing work spindle on the work table, an indexing mechanism for the work spindle including an indexing element having resetting and indexing movements, an electrical control system for the machine including left and right relay switches, and left and right actuating switches, a solenoid and connections actuated thereby for imparting alternate resetting and indexing movements to the indexing element, an auxiliary circuit including a limit switch rendered operative by rotation of the work spindle through a predetermined angular distance to disable one of said left and right actuating switches, a second auxiliary circuit including a table controlled switch for energizing and de-energizing the solenoid, and a plug through which connection of said auxiliary circuits to the solenoid and limit switch is made.

EDWARD E. COFFIN.
AUGUST L. KRAUSE.